(12) United States Patent
Calsyn et al.

(10) Patent No.: US 9,268,615 B2
(45) Date of Patent: *Feb. 23, 2016

(54) DISTRIBUTED COMPUTING USING COMMUNITIES

(75) Inventors: Martin Calsyn, Cambridge (GB);
Alexander Brandle, Cambridge (GB);
Vassily Lyutsarev, Cambridge (GB);
Andreas Heil, Linkenheim (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 786 days.

This patent is subject to a terminal disclaimer.

(21) Appl. No.: 12/790,105

(22) Filed: May 28, 2010

(65) Prior Publication Data

US 2011/0295949 A1 Dec. 1, 2011

(51) Int. Cl.
*G06F 9/50* (2006.01)

(52) U.S. Cl.
CPC .................................. *G06F 9/5072* (2013.01)

(58) Field of Classification Search
CPC .............................. G06F 3/04842; G06F 3/064
See application file for complete search history.

(56) References Cited

U.S. PATENT DOCUMENTS

| | | | | |
|---|---|---|---|---|
| 5,551,037 A * | 8/1996 | Fowler et al. | ................. | 719/313 |
| 5,966,072 A | 10/1999 | Stanfill et al. | | |
| 7,174,370 B1 | 2/2007 | Saini et al. | | |
| 7,937,704 B2 * | 5/2011 | McKee | ........................ | 718/102 |
| 2005/0182844 A1 * | 8/2005 | Johnson et al. | ............... | 709/230 |
| 2005/0273773 A1 * | 12/2005 | Gold et al. | .................... | 717/139 |
| 2006/0075407 A1 | 4/2006 | Powers et al. | | |
| 2006/0112123 A1 | 5/2006 | Clark et al. | | |
| 2007/0100961 A1 | 5/2007 | Moore | | |
| 2007/0239694 A1 * | 10/2007 | Singh et al. | ....................... | 707/3 |
| 2007/0260668 A1 * | 11/2007 | Chen et al. | .................... | 709/201 |
| 2008/0028300 A1 | 1/2008 | Krieger et al. | | |
| 2008/0250329 A1 | 10/2008 | Stefik et al. | | |
| 2008/0276252 A1 | 11/2008 | Pronovost et al. | | |
| 2009/0063998 A1 | 3/2009 | Huang et al. | | |
| 2009/0157590 A1 | 6/2009 | Mijares et al. | | |

(Continued)

OTHER PUBLICATIONS

"2020 Science", retrieved on May 8, 2009 at <<http://research.microsoft.com/en-us/um/cambridge/projects/towards2020science/downloads/T2020S_Report.pdf>>, Microsoft Corporation 2006, 43 pages.

(Continued)

*Primary Examiner* — Djenane Bayard
(74) *Attorney, Agent, or Firm* — Steve Wight; Judy Yee; Micky Minhas

(57) ABSTRACT

Distributed computing using communities is described. In an embodiment computations in a distributed computing system are driven and controlled by a document storing a distributed computing graph, a graph layout view of that graph and visualization elements. For example, the document is replicated and synchronized at each of a plurality of entities in the distributed computing system. In examples a community may be drawn as a rectangle or other shape in the graph layout view and represents one or more computing resources in the distributed computing system. For example by placing graphical elements representing currently executing processes into the community on the graph layout view a user is able to ensure that those processes execute using the computing resources of the community. In examples communities may be nested and may have parameters specifying conditions which are to be met by the computing resources they represent.

20 Claims, 19 Drawing Sheets

(56) References Cited

U.S. PATENT DOCUMENTS

2009/0276771 A1   11/2009   Nickolov et al.
2009/0300184 A1*  12/2009   Karve et al. .................. 709/226
2009/0313331 A1   12/2009   Rasmussen et al.
2009/0327302 A1   12/2009   Richardson et al.

OTHER PUBLICATIONS

Adams, et al., "Understanding height-structured competition in forests: is there an R for light?", retrieved on May 8, 2009 at <<http://www.ph.ed.ac.uk/~s0676158/pdf/adams_etal_07.pdf>>, Proceedings of the Royal Society B (2007) 274, pp. 3039-3047, published online Oct. 10, 2007.

"Amazon Simple Storage Service Developer Guide", retrieved on May 12, 2009 at <<http://docs.amazonwebservices.com/AmazonS3/2006-03-01/>>, Apr. 9, 2009, 4 pages.

Belhajjame, "Semantic Replaceability of eScience Web Services", retrieved on May 8, 2009 at <<http://ieeexplore.ieee.org/stamp/stamp.jsp?arnumber=04426918>>, Third IEEE International Conference on e-Science and Grip Computing, IEEE 2007, pp. 449-456.

Bethel, et al., "VACET: Proposed SciDAC2 Visualization and Analytics Center for Enabling Technologies", retrieved on Apr. 8, 2010 at <<http://www.sci.utah.edu/~csilva/papers/VACET_SciDAC06_LBNL-60413.pdf>>, Journal of Physics: Conference Series, vol. 46, No. 1, 2006, pp. 561-569.

Brodlie, et al., "Distributed and Collaborative Visualization", retrieved on Apr. 8, 2010 at <<http://www.comp.leeds.ac.uk/vvr/gViz/publications/CGF_dcvstar.pdf>>, The Eurographics Association and Blackwell Publishing, Computer Graphics Forum, vol. 23, No. 2, 2004, pp. 223-251.

De Roure, et al., "myExperiment-A Web 2.0 Virtual Research Environment", retrieved on May 8, 2009 at <<http://eprints.ecs.soton.ac.uk/13961/1/myExptVRE31.pdf"">, 4 pages.

"ESSE Visualization Plugin for NASA World Wind", retrieved on May 12, 2009 at <<http://www.codeplex.com/VisualEsse>>, May 6, 2007, 1 page.

"Excel Home Page—Microsoft Office Online", retrieved on May 12, 2009 at <<http://office.microsoft.com/en-us/excel/FX100487621033.aspx>>, Microsoft Corporation 2009, 1 page.

Freeman, et al., "Cyberinfrastructure for Science and Engineering: Promises and Challenges", retrieved on May 8, 2009 at <<http://ieeexplore.ieee.org/stamp/stamp.jsp?tp=&isnumber=&arnumber=1398020>>, from the Proceedings of the IEEE, vol. 93, No. 3, Mar. 2005, pp. 682-691.

Gu, et al., "Falcon: On-line Monitoring and Steering of Parallel Program", retrieved on May 8, 2009 at <<http://citeseerx.ist.psu.edu/viewdoc/download?doi=10.1.1.53.3989&rep=rep1&type=pdf>>, Submitted to the IEEE TPDS—Nov. 1994, Revised Sep. 1995, pp. 1-46.

Hart, et al., "Interactive Visual Exploration of Distributed Computations", retrieved on May 8, 2009 at <<http://citeseerx.ist.psu.edu/viewdoc/download?doi=10.1.1.27.5278&rep=rep1&type=pdf>>, Department of Computer Science Washington University in Saint Louis, 7 pages.

Heikkinen, et al., "Methods and uncertainties in bioclimatic envelope modelling under climate change", retrieved on May 8, 2009 at <<http://www.mncn.csic.es/pdf_web/maraujo/Heikkinen_et_al_PPG2006.pdf>>, Progress in Physcial Geography 30, 6 (2006), pp. 1-27.

Heil, "LCARS—The Next Generation Programming Context", retrieved on May 8, 2009 at <<http://delivery.acm.org/10.1145/1150000/1145711/p29-heil.pdf?key1=1145711&key2=9111912421&coll=GUIDE&dl=GUIDE&CFID=34321032&CFTOKEN=41524811>>, AVI 2006, May 23, 2006, Venice, Italy, pp. 29-31.

Hey, et al., "Cyberinfrastructure for e-Science", retrieved on May 12, 2009 at <<http://www.sciencemag.org/cgi/content/abstract/308/5723/817>>, Science Magazine, May 6, 2005, vol. 38, No. 5723, 2 pages.

Hey, et al., "The Data Deluge: An e-Science Perspective", retrieved on May 8, 2009 at <<http://www.rcuk.ac.uk/cmsweb/downloads/rcuk/research/esci/datadeluge.pdf>>, To be Published in Grip Computing-Making the Global Infrastructure a Reality, Wiley, Jan. 2003, pp. 1-17.

Hey, et al., "The UK e-Science Core Programme and the Grid", retrieved on May 8, 2009 at <<http://eprints.ecs.soton.ac.uk/7644/1/UKeScienceCoreProg.pdf>>, Future Generation Computer Systems 18 (2002) pp. 1017-1031.

Hinckley, et al., "InkSeine: In Situ Search for Active Note Taking", retrieved on May 8, 2009 at <<http://research.microsoft.com/en-us/um/people/kenh/papers/InkSeine-CHI2007.pdf>>, CHI 2007, Apr. 28-May 3, 2007, San Jose, CA., 10 pages.

Hornik, "R FAQ—Frequently Asked Questions on R", retrieved on May 12, 2009 at <<http://CRAN.R-project.org/doc/FAQ/R-FAQ.html>>, Version 2.9.2009-04-28, 130 pages.

Hull, et al., "Taverna: a tool for building and running workflows of services", retrieved on May 12, 2009 at <<http://nar.oxfordjournals.org/cgi/content/full/34/suppl_2/W729>>, Nucleic Acids Research 2006 34 (Web Server issue): 11 pages.

Kaugars, et al., "PARVIS: Visualizing Distributed Dynamic Partioning Algorithms", retrieved on May 8, 2009 at <<http://citeseerx.ist.psu.edu/viewdoc/download;jsessionid=558A2D24E991550A7BC92A2E4BFCE81B?doi=10.1.1.43.5962&rep=rep1&type=pdf>>, Department of Computer Science, Western Michigan University, MI, 7 pages.

Kumar, et al., "IFLOW: Resource-Aware Overlays for Composing and Managing Distributed Information Flows", retrieved on Apr. 8, 2010 at <<http://www.cc.gatech.edu/systems/papers/schwan/Kumar05IFL.pdf>>, ACM, Proceedings of EuroSys, Leuven, BE, Apr. 18, 2006, pp. 1-14.

Lesk, "Online Data and Scientific Progress: Content in Cyberinfrastructure", 2004.

Lopez-Benitez, et al., "Simulation of Task Graph Systems in Heterogeneous Computing Environments", retrieved on May 12, 2009 at <<http://ieeexplore.ieee.org/stamp/stamp.jsp?arnumber=765116&isnumber=16539>>, Department of Computer Science, College of Engineering, Texas Tech University, 13 pages.

"Microraptor: A Distributed Process Management and Control System", retrieved on May 12, 2009 at <<http://www.microraptor.org/>>, Jan. 12, 2007, 2 pages.

Mishchenko, et al., "Distributed Visualization Framework Architecture", retrieved on Apr. 8, 2010 at <<ftp://ftp.cse.ohio-state.edu/pub/tech-report/2008/TR20.pdf>>, IEEE Transactions on Visualization and Computer Graphics, vol. 14, No. 6, 2008, pp. 1173-1180.

"MM5 Community Model", retrieved on May 12, 2009 at <<http://www.mmm.ucar.edu/mm5>>, 1 page.

Muggleton, "Exceeding Human Limits", retrieved on May 8, 2009 at <<http://dev.pubs.doc.ic.ac.uk/mugg-limits/mugg-limits.pdf>>, Nature Publishing Group, vol. 440, Mar. 23, 2006, pp. 409-410.

"myExperiment", retrieved on May 8, 2009 at <<http://www.myexperiment.org/>>, The University of Manchester and University of Southampton, 2007-2008, 4 pages.

"myExperiment: Social Networking for Workflow-using eScientists", retrieved on May 8, 2009 at <<http://eprints.ecs.soton.ac.uk/15095/1/Works112v-goble2.pdf>>, Works 2007, Jun. 25, 2007, Monterey, CA., 2 pages.

"Nasa World Wind", retrieved on May 12, 2009 at <<http://worldwind.arc.nasa.gov>>, 2 pages.

Neophytou, et al., "WhiteBoard P2P: A Peer-to-Peer Reliable Data Dissemination Infrastructure for Collaborative Applications", retrieved on Apr. 12, 2010 at <<http://www.cs.pittedu/~panickos/publications/conference/wbp2p-isyc06.pdf>>, International Conference on Intelligent Systems and Computing: Theory and Applications (ISYC), Ayia Napa, CY, Jul. 2006, pp. 317-326.

Preston, et al., "Simulation-based Architectural Design and Implementation of a Real-time Collaborative Editing System", retrieved on Apr. 12, 2010 at <<http://delivery.acm.org/10.1145/1410000/1404730/p320-preston.pdf?key1=1404730&key2=0816601721&coll=GUIDE&dl=GUIDE&CFID=75646207&CFTOKEN=10570869>>, Society for Computer Simulation International, Proceedings of the Spring Simulation Multiconference, vol. 2, Norfolk, VA, 2007, pp. 320-327.

(56) References Cited

OTHER PUBLICATIONS

Purves, et al., "Crown Plasticity and Competition for Canopy Space: A New Spatially Implicit Model Parameterized for 250 North American Tree Species", retrieved on May 12, 2009 at <<http://research.microsoft.com/apps/pubs/default.aspx?id=68031>>, Jan. 2007, 1 page.
Rose, et al., "Plasma: a graph based distributed computing model", retrieved on May 8, 2009 at <<http://rosejn.net/publications/plasma_graphs.pdf, University of Lugano Faculty of Informatics, Switzerland, pp. 1-6.
Russell, et al., "The Cost Structure of Sensemaking", retrieved on May 8, 2009 at <<http://delivery.acm.org/10.1145/170000/169209/p269-russell.pdf?key1=169209&key2=8911912421&coll=GUIDE&dl=GUIDE&CFID=34321171&CFTOKEN=99489322>>, Interchi 1993, Apr. 24-29, pp. 269-276.
Shanahan, et al., "Amazon.com Mashups", retrieved on May 12, 2009 at <<http://www.amazon.com/Amazon-com-Mashups-Francis-Shanahan/dp/0470097779>>, 10 pages.
Smith, "Monitoring Ecosystems the High-tech Way", Computer World, Canada, Mar. 7, 2009.
Strigul, et al., "Crown Plasticity and Large-scale Forest Dynamics: A New Method of Modeling Vegetation Dynamics", Ecological Monographs (in press).
"Taverna Project Website", retrieved on May 12, 2009 at http://taverna.sourceforge.net/>>, 1 page.
Walker, et al., "An Instrumentation System for Post-Mortem Visualization of Distributed Algorithm", retrieved on May 8, 2009 at <<http://ieeexplore.ieee.org/stamp/stamp.jsp?arnumber=592231&isnumber=12954>>, IEEE 1997, pp. 684-687.
Weis, et al., "Rapid Prototyping for Pervasive Applications", retrieved on May 8, 2009 at <<http://ieeexplore.ieee.org/stamp/stamp.jsp?tp=&arnumber=4160609>>, Pervasive Computing, Published by the IEEE Computer Society, 2007, pp. 76-84.
Zhang, "OptiStore: An On-Demand Data Processing Middleware for Very Large Scale Interactive Visualization", retrieved on Apr. 8, 2010 at <<http://snorky.evl.uic.edu/files/pdf/OptiStore.Thesis.pdf>>, University of Illinois at Chicago, Doctoral Thesis, 2007, pp. 1-173.
Zhao, et al., "Distributed execution of aggregated multi domain workflows using an agent framework", retrieved on May 8, 2009 at <<http://ieeexplore.ieee.org/stamp/stamp.jsp?arnumber=04278795>>, 2007 IEEE Congress on Services (Services 2007), 8 pages.
Zhao, et al., "Swift: Fast, Reliable, Loosely Coupled Parallel Computation", retrieved on May 8, 2009 at <<http://www.ci.uchicago.edu/swift/papers/Swift-SWF07.pdf>>, to appear: 2007 IEEE International Workshop on Scientific Workflows, Salt Lake City, Utah, 9 pages.
Zhizhin, et al., "Environmental Scenario Search and Visualization", retrieved on May 8, 2009 at <<http://esse.wdcb.ru/papers/EnvironmentalScenarioSearchAndVisualization.pdf>>, ACM GIS 2007, Nov. 7-9, 2007, Seattle, WA., 10 pages.
Office Action for U.S. Appl. No. 12/484,773, mailed on Oct. 27, 2011, Andreas Heil, "Distributed Computing Management", 18 pgs.
Office Action for U.S. Appl. No. 12/484,773, mailed on Mar. 6, 2012, Andreas Heil, "Distributed Computing Management", 15 pgs.

* cited by examiner

DISTRIBUTED COMPUTING USING COMMUNITIES

BACKGROUND

Distributed computing is required in many application domains. For example, computational science, management of distributed database systems, management of distributed computing systems for bio-informatics, image analysis, or other applications in which very large amounts of data are to be processed or huge amounts of computational resources are required. However, orchestration of complex data flows of substantial amounts of data from live (streaming) sources is difficult with existing approaches. Communities may be thought of as groups of one or more computing devices in a distributed computing system.

The use of distributed computing systems is becoming more widespread. Often computational processes are decomposed into multiple subprocesses which are executed on different computing systems or computational processes are divided into fragments and the fragments are spread over multiple systems to be computed. Management of these distributed computing systems is typically carried out by a single entity which "owns" the computational process and there is a general need to simplify and improve the manner in which the management is achieved. For example, existing tools to manage scientific workflows enable a scientist to make use of remote computing resources to carry out in-silico experiments. However, it is difficult to enable the experiments to be managed by multiple users working on different computers at the same time in a simple and effective manner. In addition, existing approaches are often unsuited to novice users who have little or no knowledge of remote computing resources that may be used.

There is an increasing need to harness the cumulative power of multiple computing devices owned by a single person (e.g. an individual's laptop, office desktop computer and home computer) or to harness the power of grid and cloud computing. For example, multiple computing devices owned by a single person or which are harnessed for a particular computing activity may be thought of as a community of computing devices. However, current systems do not enable this to be achieved in a simple to use and effective manner. As a result it is difficult to engage in collaborative design, development and review of scientific or technical computing projects. In addition, the results of any such collaborative computations are difficult to visualize and use by executives, policy-makers and other users.

The embodiments described below are not limited to implementations which solve any or all of the disadvantages of known distributed computing systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Distributed computing using communities is described. In an embodiment computations in a distributed computing system are driven and controlled by a document storing a distributed computing graph, a graph layout view of that graph and visualization elements. For example, the document is replicated and synchronized at each of a plurality of entities in the distributed computing system. In examples a community may be drawn as a rectangle or other shape in the graph layout view and represents one or more computing resources in the distributed computing system. For example by placing graphical elements representing currently executing processes into the community on the graph layout view a user is able to ensure that those processes execute using the computing resources of the community. In examples communities may be nested and may have parameters specifying conditions which are to be met by the computing resources they represent.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
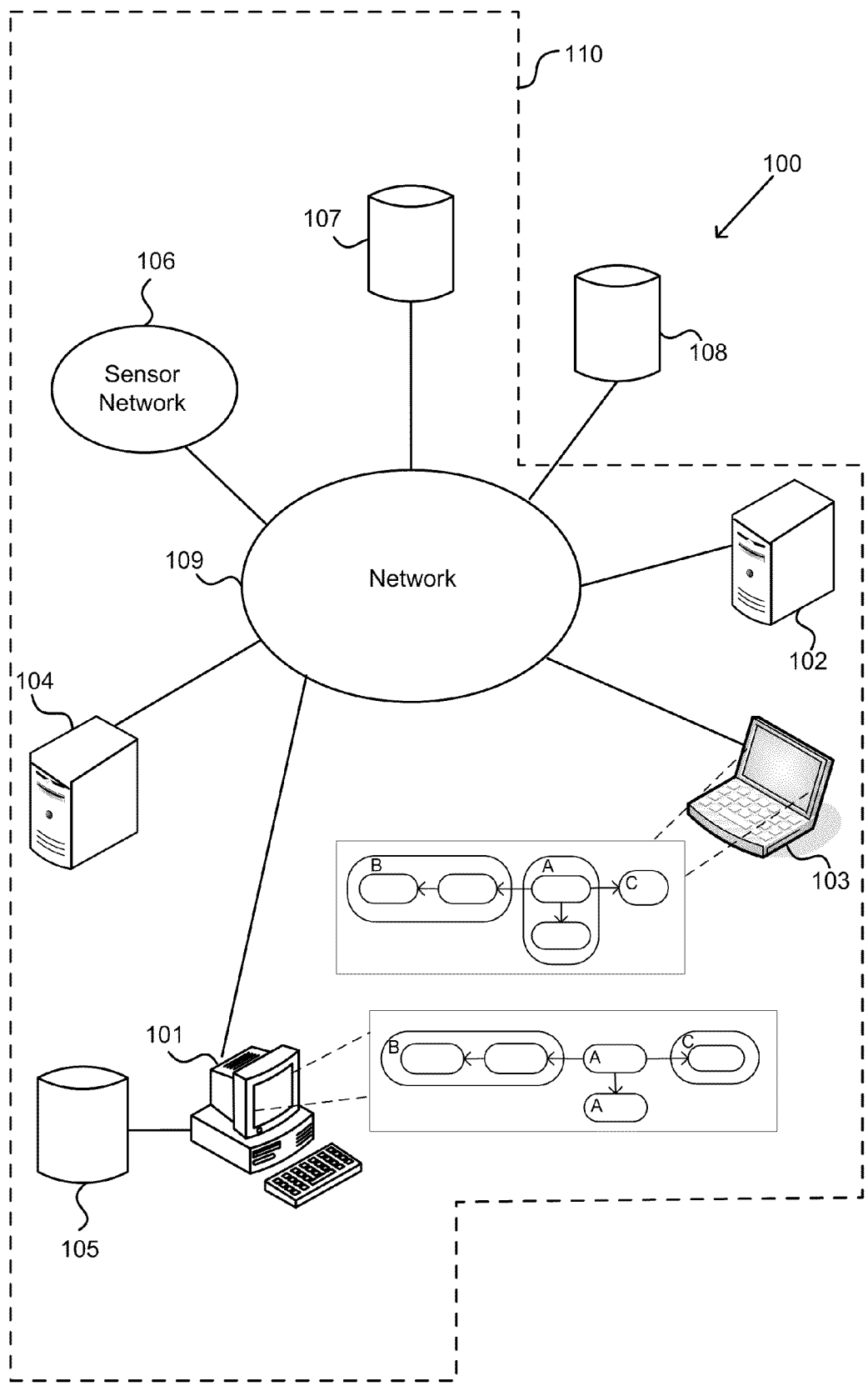
FIG. 1 is a schematic diagram of a distributed computing system.

FIG. 1 is a schematic diagram of a distributed computing system in which embodiments of the invention may be implemented. It comprises a network 109 which is any communications network which enables data to be transferred between entities 101-108 in that network. Many more entities may be present although FIG. 1 illustrates only 8 entities for clarity. An entity in the distributed computing system may comprise a physical processor such as personal computer, super computer or other processor (multi-core processor or single core). An entity in the distributed computing system may also be a logical construct such as a plurality of physical machines that appear to a user as one logical unit. It is also possible for an entity in the distributed computing system to be a virtual system such as a virtual personal computer or any other computing device. Some of the entities in the distributed computing system may provide access to data; for example, these may be databases 105, 107, 108 and/or may be sensor networks 106 which actively sense data. The distributed computing system may comprise one or more communities 110 which are groups of one or more entities. Communities are described in more detail later in this document.

The entities in the distributed computing system are arranged to enable activities to be carried out in the distributed computing system under the control of one or more distributed computing graphs. An activity is one or more processes which are associated with an aim or objective. For example, the activity may be an experiment, a data centre management process, a computational computing objective or other group of processes associated with an objective. Each activity has an associated distributed computing graph which controls currently executing processes in the distributed computing system in order to carry out the activity. Entities in the distributed computing system are aware of the distributed computing graph and this is achieved in any suitable manner. For example, the distributed computing graph may be replicated at the entities. It is also possible for the distributed computing graph to be shared amongst the entities using a peer-to-peer distribution system of any suitable type. As described in more detail below, each entity has a graph layout view of the distributed computing graph and is aware of communication protocols, addresses and contracts associated with the processes assigned to the distributed computing graph.

The term "distributed computing graph" is used to refer to a data structure storing a plurality of nodes connected by links where each node represents a currently executing process at a specified entity in a distributed computing system. For example, the process may be a computational process which takes data from one or more sources (which could also be other processes) and produces output. It is also possible for the process to be one which retrieves data from a source and reformats or pre-processes that data so that it is suitable for a later computation process. In this case the data sourc(es) are specified at the node representing the process. Entities in the distributed computing system are arranged to carry out the represented processes (which may be parallel, concurrent or sequential) using the specified entities and data sources. Each distributed computing graph is associated with an activity as described above.

For example, one of the entities in the distributed computing system may be a PC 101 operated by an end user in order to participate in a collaborative computing activity with other entities. The PC may provide a graphical user interface which displays a graph layout view of a distributed computing graph as illustrated schematically in FIG. 1. The end user is able to edit the graph layout view of the distributed computing graph in order to carry out a type of programming activity. Changes that the end user makes to the graph layout view cause the underlying distributed computing graph to update and thus control the currently executing processes that form the activity. End users at other entities in the distributed computing system are also able to control those currently executing processes in a collaborative manner by using graph layout views at their respective entities.

End users are also able to view the outputs of an activity. For example, an entity in the distributed computing system may be a laptop computer 103 displaying data resulting from an activity as illustrated schematically in FIG. 1. Various views, viewports and user interface objects may be created and edited by an end user and associated with the distributed computing graph in order to achieve this. Those views, viewport and user interface objects are collectively referred to in this document as a visualization layer. All the entities in the distributed computing system are aware of the visualization layer in the same manner as for the distributed computing graph.

In an example, a data source such as a text file exists on a local machine operated by a user. The user is able to create or modify a graph layout view of a distributed computing graph using a user interface at an entity in the distributed computing system, such as PC 101. This is achieved by connecting a node representing the text file to one or more other nodes representing other entities in the distributed computing system and in this way a process is added to the graph. For example, these other entities may comprise a remote web service. The edge in the graph created between the text file node and the web service node may be implemented using a SOAP call to the web service to send the text file data to the web service for processing. However, this is not essential. Any suitable method of implementing the edge in the graph may be used. Another process may then be added to the graph layout view of the distributed computing graph. For example, this process may be a local executable file which is added as a node to the graph layout view by connecting it to the node representing the web service. This connection may be implemented using a SOAP call to the web service to pull the processed text file data from the web service. Another process may be created and a node representing it connected to the node representing the executable file. This newly added process may represent a file comprising the pulled data and is interpreted as a file by the distributed computing system. In this way a file system is effectively used to perform the process making use of remote web services. The file system and web service are examples only and may be substituted by any other suitable technology. For example, databases, custom executable files for computational processes, reading and writing to and from files.

Within the distributed computing system processes are able to notify each other. This is implemented using any suitable notification mechanism, for example, using push and pull notification mechanisms or publish and subscribe mechanisms. Once a process is completed, for example, the web service call is finished in the above example, a local representation of the process actively sends out (to all entities in the distributed computing system) a notification to indicate this using the particular notification mechanism being used.

Any suitable methods may be used to enable the processes and the local graph nodes to communicate. For example, an application programming interface is provided at each entity. This may be used by a programmer to link a process to a local graph item. For example, the application programming interface provides a set of contracts and communication mechanisms to be used by local representations of processes (in the graph layout views) to communicate with one another in the distributed computing system. In this way the graph layout view of a process may be thought of as a wrapper which enables a process to talk to one or more other graph items. Thus process events such as process notification, process error, process completion may be communicated to other graph items. Whether two processes are able to communicate may be specified by details in the wrappers.

Figure 2:
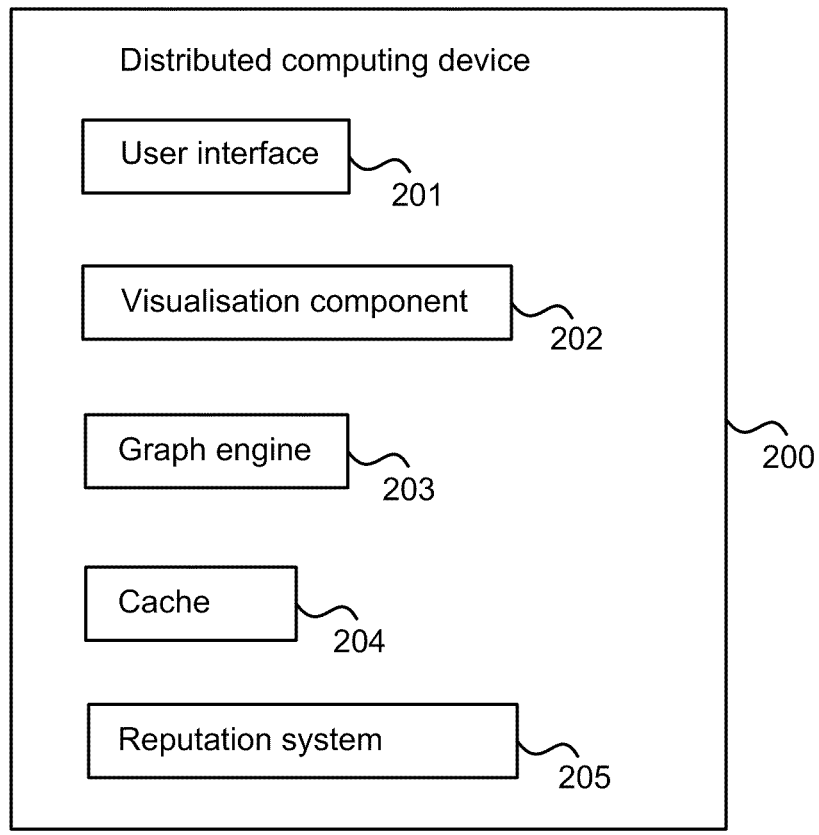
FIG. 2 is a schematic diagram of a computing-based device arranged to be part of a distributed computing system.

FIG. 2 is a schematic diagram of an entity in the distributed computing system 100 of FIG. 1 in more detail. The entity, such as PC 101 comprises a user interface 201; a graph engine 203, optionally a visualization component 202, and a cache 204. The user interface 201 provides a facility whereby a user is able to understand and/or control a computational computing activity implemented in the distributed computing system. The graph engine 203 is arranged to provide a dynamic mapping between a graph layout view of a distributed computing graph and the distributed computing graph itself. More detail about graph layout views is given below. The optional visualization component 202 is arranged to enable results of a computational computing activity to be presented at the user interface. The cache 204 is an optional data store arranged to store data produced by or during the activity. The entity may also comprise a reputation system 205 for assigning reputation points to any one or more of: users, communities, and extensions. Extensions will be described in more detail later in this document.

Figure 3:
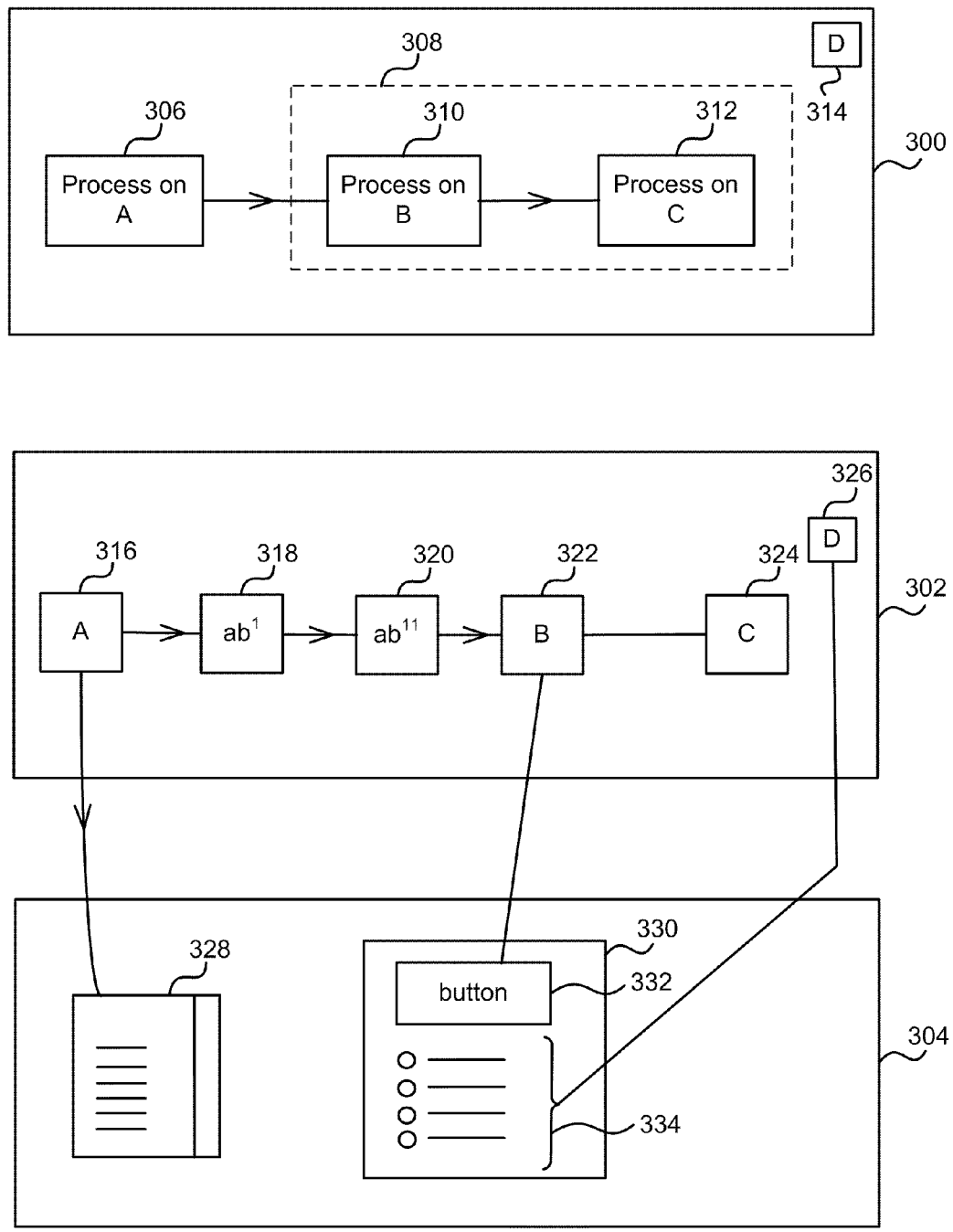
FIG. 3 is a schematic diagram of a distributed computing graph, a graph layout view of that distributed computing graph and of a visualization layer associated with the distributed computing graph.

FIG. 3 is a schematic diagram of a graph layout view of a distributed computing graph 300, a distributed computing graph 302 and a visualization layer 304. Together the graph layout view 300, the distributed computing graph 302 and the visualization layer 304 are referred to in this document as forming an activity. The graph layout view may be stored as a document detailing the graphical items in the graph layout view, their positions and how they are connected. This may be referred to as the topography of the graph layout view. The graph layout view may be thought of as "source code" created by an end user and the document storing the graph layout view is a visual representation of that source code. The distributed computing graph 302 itself is not visible to the end user and may also be stored as a document as may the visualization layer 304.

It is possible for the graph layout view to contain visual elements that are not represented in the distributed computing graph. For example, comments, titles, callouts, and other visual elements which do not affect computation but which enhance a user's understanding of the graph.

The graph layout view 300 of the distributed computing graph comprises nodes 306, 310, 312, 314 connected by links. At least some of the nodes represent processes carried out at specified entities in a distributed computing system. For example, node 306 represents a process carried out at machine A (for example this might be to retrieve data); node 310 represents a process carried out at machine B (for example, to carry out computations using the data from node A) and node 312 represent processes carried out at machine C of FIG. 1 (for example to carry out computations on the results provided by node B). Node 314 may represent processes to retrieve or format data from entity D. Nodes 310 and 312 may be in a community 308. A community is represented as a visually distinguished region on a graph layout view of the distributed computing graph. For example, the community may be represented as a rectangle or other shape enclosing graphical elements in the graph layout view. When a user drags a community onto the graph layout view it appears as a rectangular region that can be moved or sized. A user is able to drag nodes representing currently executing processes into the graph layout view and place those either outside or inside a community. Nodes placed outside a community will be executed on the local computer which is providing the graph layout view (in this example, machine A). Nodes placed inside a community rectangle are executed remotely on the resources of that community. Any suitable ones of the community resources are used in a manner that is transparent to the user who edits the graph layout view. In addition, the particular resources in the community that are used may change over time without the user who edits the graph layout view being aware of that change. A user editing the graph layout view is thus able to specify which processes are to be executed at a community resource without the need for detailed knowledge about entities that make up that community. By representing communities graphically in the graph layout view and providing the dynamic updating between the graph layout view and the underlying distributed computing graph it is possible to harness the computing power of grid and cloud computing in a simple and effective manner. In addition, a user is able to harness computing power from a community which is formed from his or her own computing devices.

Another example of a community is given in FIG. 1 which shows entities within dotted line 110 forming a community. For example, a scientist may need to carry out a new experiment and may set up a community 110 comprising users, resources and data. The users may comprise the scientist and his or her assistant. The resources may comprise the scientist's research computer, home computer, laptop and the assistant's research computer. The scientist specifies one or more data sources. The scientist may belong to a plurality of different communities. In the example of FIG. 1, database 108 and entity 104 are outside the community 110 and are unable to access any resources of the community. However, entities within the community may be able to access database 108 and entity 104 outside the community by using appropriate credentials or in other manners.

Figure 4:
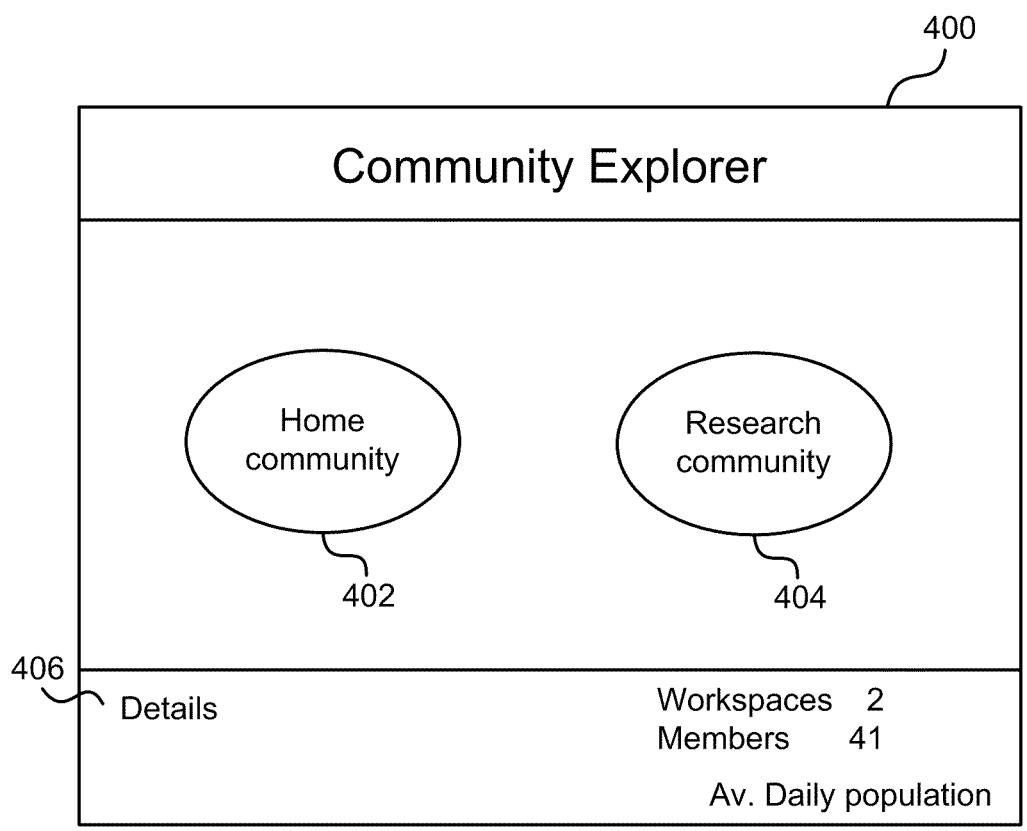
FIG. 4 is an example user interface display at an entity in a distributed computing system.

As described above with reference to FIG. 2 an entity in the distributed computing system may comprise a user interface 201 which provides a facility to view and modify communities. For example, FIG. 4 shows an example user interface display 400 which may be provided at local machine A 101 of FIG. 1 for example. In this example, the user at local machine A is a member of two communities 402, 404 which are illustrated schematically. The user interface display provides details 406 about the communities such as the number of members in a community, the number of workspaces a given community has, and an average daily population of active members in the community. A workspace is associated with one or more activities (such as an experiment or other computational computing activity) and a given community may comprise one or more workspaces. Each activity has its own distributed computing graph and is able to access all resources within its associated communities. A distributed computing graph is limited to the scope of its associated activity and so is not part of two different activities.

FIG. 3 also shows a distributed computing graph 302 corresponding to the graph layout view 300. It comprises nodes for each of the processes in the graph layout view. In this case, node 316 corresponds to node 306, node 322 corresponds to node 310, node 324 corresponds to node 312 and node 326 corresponds to node 314. One or more intermediaries 318, 320 may be present in the distributed computing graph which are not visible in the graph layout view. For example, these may be intermediaries which are automatically inserted by a graph engine 203 in order to reformat data and or adapt communications formats or protocols where required in order to allow processes to inter-work.

A visualization layer 304 is illustrated in FIG. 3. This layer is optional and enables a display of outputs from an activity to be easily created and managed. The visualization layer may comprise any combination of views, view ports and user interface objects. For example, these views, view ports and user interface objects are connected to nodes in the distributed computing graph using a suitable application programming interface. This enables data output from the processes represented by the nodes of the distributed computing graph to be directly provided to the visualization layer. For example, FIG. 3 shows a web page 328 displaying data from process A 316 of the distributed computing graph. It also shows a graphical user interface display 330 comprising a button 332 that may be activated or deactivated depending on data output from process B 322 of the distributed computing graph. A ranked list of documents 334 may also be presented at this graphical user interface display 330 using output from process D 326 of the distributed computing graph.

Each participant in an activity has access to the associated distributed computing graph even if that participant does not host any parts of that activity. The graph layout view is maintained in parallel with the distributed computing graph so that it corresponds to the distributed computing graph. If a change is made to the graph layout view of the distributed computing graph this change is dynamically updated in the distributed computing graph itself and so is updated in the graph layout view at each of the entities in the distributed computing system. That is, the graph layout view always reflects changes made by others in the distributed computing system.

As mentioned above, each participant in an activity has access to the associated distributed computing graph even if that participant does not host any parts of that activity. For example, a participant may require only to view the output of an experiment. In this case the participant connects to the distributed computing graph concerned but does not provide any input data, storage, processing capabilities or other resources for sharing.

Figure 5:
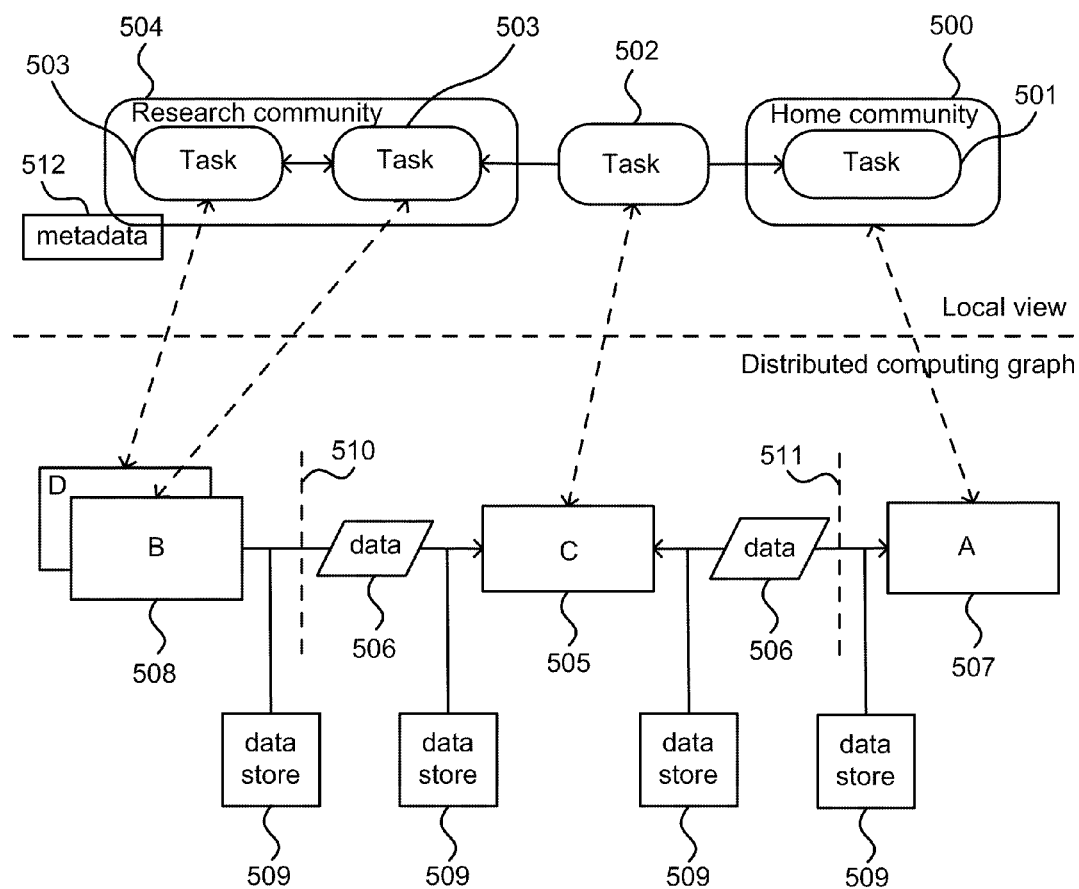
FIG. 5 shows a graph layout view of a distributed computing graph having communities and also shows an associated distributed computing graph.

Metadata may be coupled to a community as now described with reference to FIG. 5. The bottom part of FIG. 5 shows a distributed computing graph and the top part shows a graph layout view of that distributed computing graph. In this example the graph layout view comprises two communities, a research community 504 and a home computing community 500. A currently executing process or task 502 at a local machine which provides the graph layout view is able to receive data input from these two communities as indicated by the graph layout view. The Home community 500 has a task 501 currently executing on resources of that community which might be a user's home computer for example. The research community 504 has currently executing processes 503 running on a plurality of research computers at various geographical locations which form that community 504. The research community 504 has associated metadata 512 which may comprise account and login requirements (or other credentials) that are needed in order to access the community. This metadata may be stored with the community as described in more detail later in this document.

In order to enable data to successfully cross a community boundary adaptations are made to the distributed computing graph in an automated manner without the need for user input. These adaptations are not necessarily displayed as part of the graph layout view.

FIG. 5 shows two communities 500, 504 as mentioned above and data flows between task or process 502 and each of those communities. This is evident from the distributed computing graph shown in FIG. 5 which shows data 506 flowing between currently executing process C 505 and each of currently executing processes D, B 508 and A 507. Community boundaries are crossed at dotted lines 510 and 511. These community boundaries 510, 511 represent breakable links. For example, the local computer executing process C 505 may be shut down at night or the research community 504 may be closed for maintenance. In order to allow for this the distributed computing graph may be automatically updated by inserting data stores 509 such as those illustrated in FIG. 5 where at least some of the data stores are within the community boundaries. These may then be used to cache data from the processes and that data may then be used at a later time. For example, the research community may continue executing at night and cache data to a datastore within its community boundary. When the local computer is started up process C 505 resumes and is able to receive data from the cache. In this way an end user observing the results of the activity at the local computer is able to observe the results of the process in the research community that has been active all night.

In addition, the graph engine 203 at the entities on either side of a community boundary are also arranged to implement marshalling, also known as data transformation, for the data flow. As mentioned above the graph layout view of a process may be thought of as a wrapper which enables a process to talk to one or more other graph items. Whether two processes are able to communicate may be specified by details in the wrappers. This information may be used by the graph engine 203 to automatically insert intermediaries to the distributed computing graph in order to transform the data as required in order to enable process to be connected across a community boundary.

Figure 6:
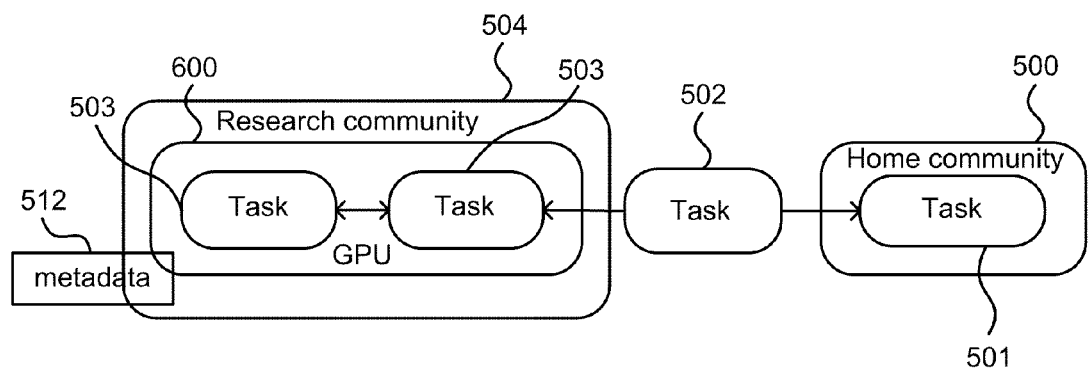
FIG. 6 shows a graph layout view of a distributed computing graph with nested communities.

As illustrated in FIG. 6 communities may be nestable. FIG. 6 shows a graph layout view of a distributed computing graph which is the same as that from FIG. 5 except that the research community 504 now contains a nested community 600. The nested community 600 has a parameter which is set to GPU (graphics processing unit) so that GPUs within the research community are members of the nested community. In this way a user is able to specify that currently executing processes 503 are to be carried out on GPUs of the research community by placing the nodes for those processes 503 within the nested community 600.

Figure 7:
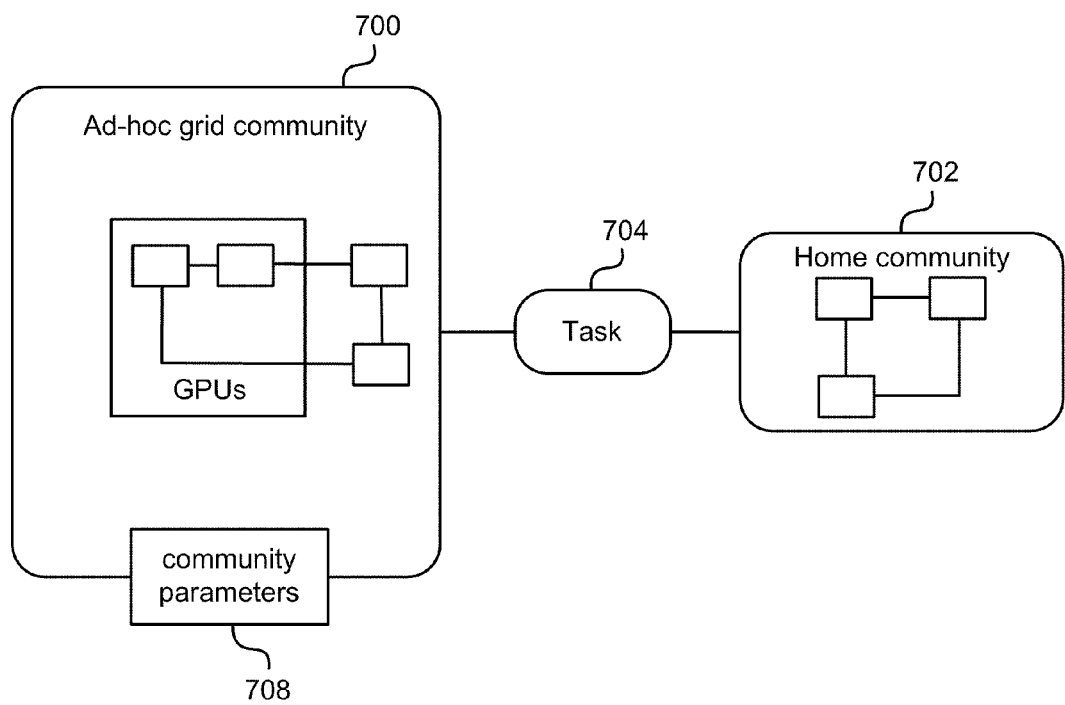
FIG. 7 shows a graph layout view of a distributed computing graph with a parameterized community.

A community may have one or more parameters which are stored with that community. In the example of FIG. 6 the nested community 600 has a parameter specifying that hardware of the community resources is to be GPUs. Other types of parameters may also be used to specify requirements about hardware (also referred to as resource class), capacity, functionality, security, geographical location, or other factors. FIG. 7 shows an example where an ad-hoc grid computing community 700 has community parameters 708. This community 700 supports a plurality of processes illustrated by nodes in the community, some of which are within a nested community for GPUs of the ad-hoc grid community. A local computer supports task 704 which communicates with the ad-hoc grid community 700 and also with a home community 702. An example of a parameter to specify requirements about capacity is: computers with a specified amount of available disk space.

Figure 8:
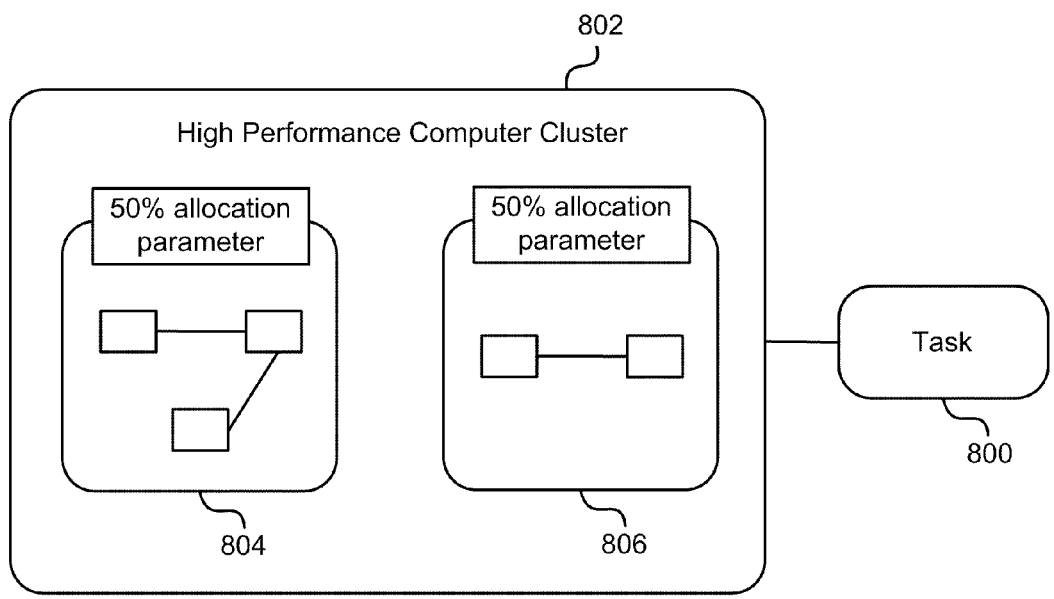
FIG. 8 shows a graph layout view of a distributed computing graph with nested, parameterized communities.

Parameters may be used to specify requirements about numbers or proportions of computing devices to be used in a community. For example, FIG. 8 shows a community 802 of high performance computers in a cluster connected to a task 800 at a local machine. The community 802 has two nested communities 804, 806 each having a 50% allocation parameter such that they each have 50% of the computing resources available in the community 802. For example, by using community parameters to specify requirements about numbers or proportions of computing devices it is possible to ensure that communities are used only if they contain a certain quorum of resources. For example, community parameters may be used to ensure that a community on a graph layout view becomes active when it is possible to reserve a specified number of CPUs.

A community may be stored as a community control document comprising:

Name of the community

An address from which the community control document can be obtained (optional)

A list of members of the community

Permissions available to each of the members such as whether the member is able to read from the community, write to the community, invite new members, delete members and other actions.

Security and authentication details (optional)

The community control document is stored as a distributed document available to each of the community members. Any suitable storage mechanism may be used and two examples are now described with reference to FIGS. 9 and 10.

Figure 9:
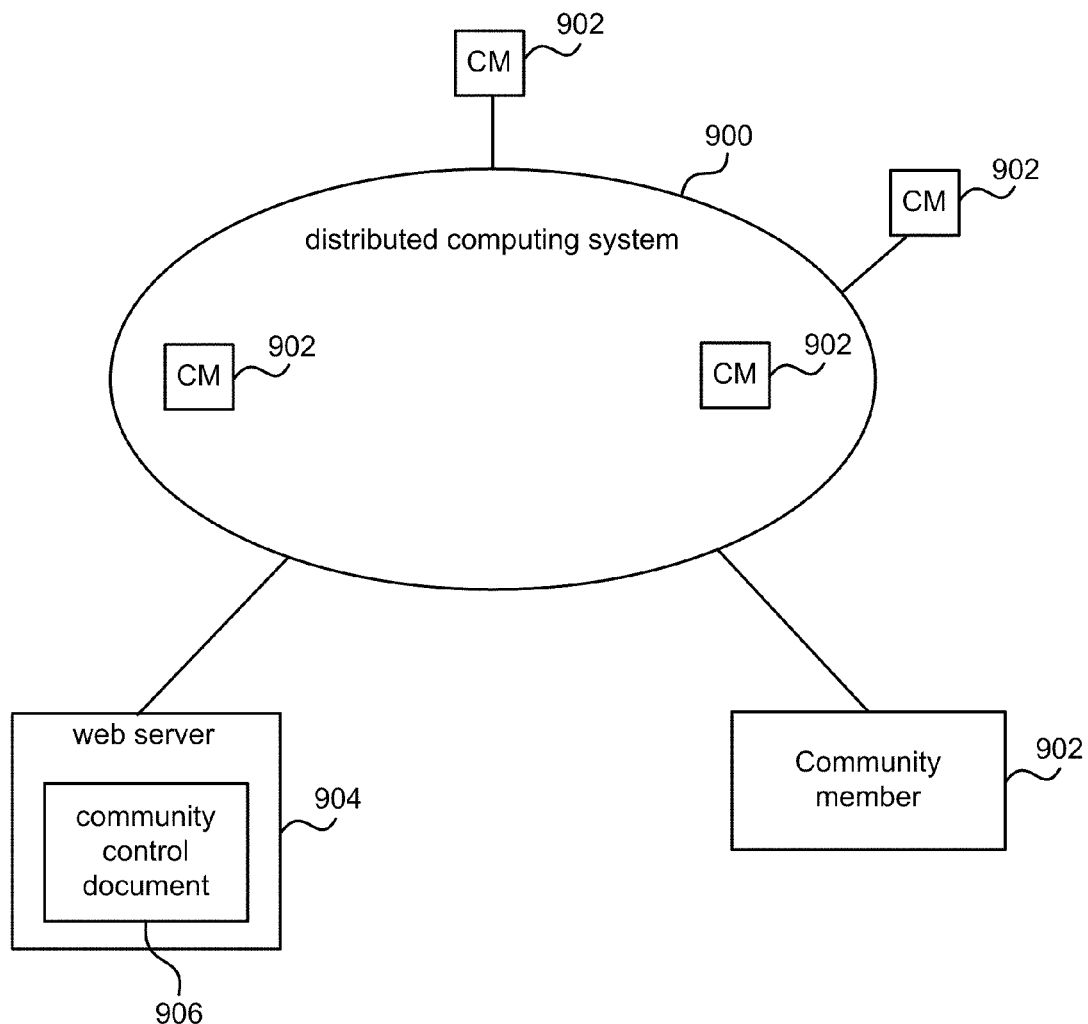
FIG. 9 is a schematic diagram of a publication community storage mechanism.

FIG. 9 is a schematic diagram of a publication community storage mechanism. A plurality of community members 902 are present in a distributed computing system 900. For example, there may be many millions of such community members. A web server 904 stores a community control document 906 for the community and makes this document available to each of the community members 902 using web based technology. Any updates to the community control document 906 are made by a process which writes to the web server 904 and the community members 902 are predominantly solely readers of the community control document 906.

Figure 10:
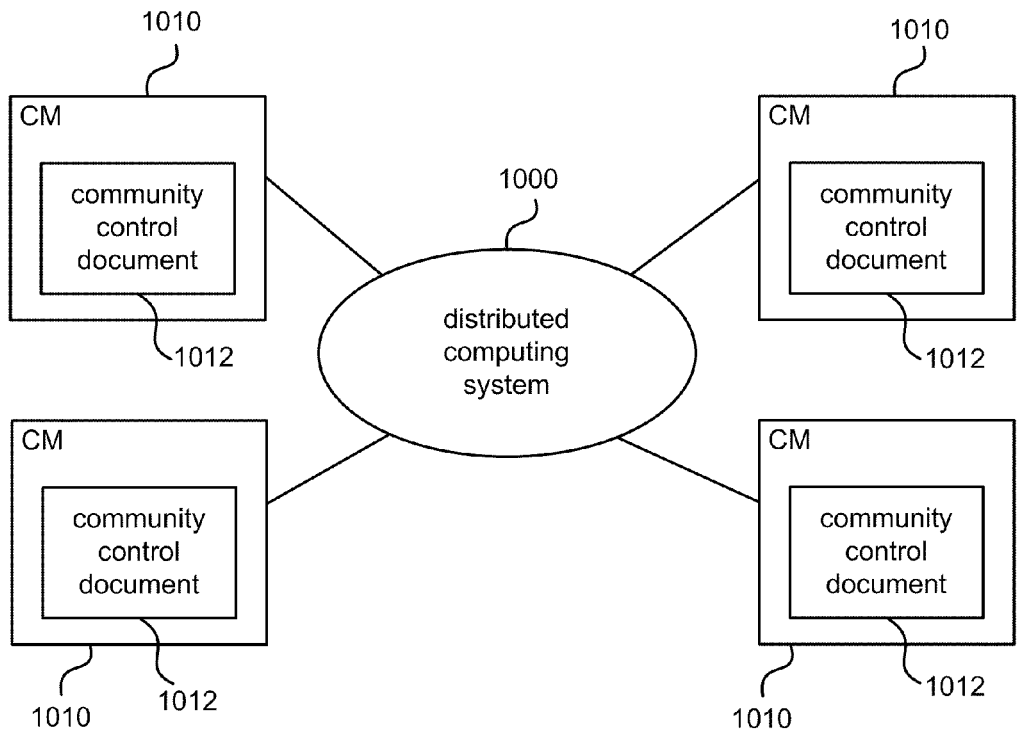
FIG. 10 is a schematic diagram of a participation community storage mechanism.

FIG. 10 is a schematic diagram of a participation community storage mechanism. A plurality of community members 1010 are in a distributed computing system 1000 and each community member 1010 has access to the community control document 1012 which is distributed. The community members 1010 are predominantly both writers to and readers from the community control document 1012. In this case a peer to peer content distribution system may be used to replicate and synchronize the community control document 1012 at each of the community members. However, any suitable data synchronization mechanism may be used.

Figure 11:
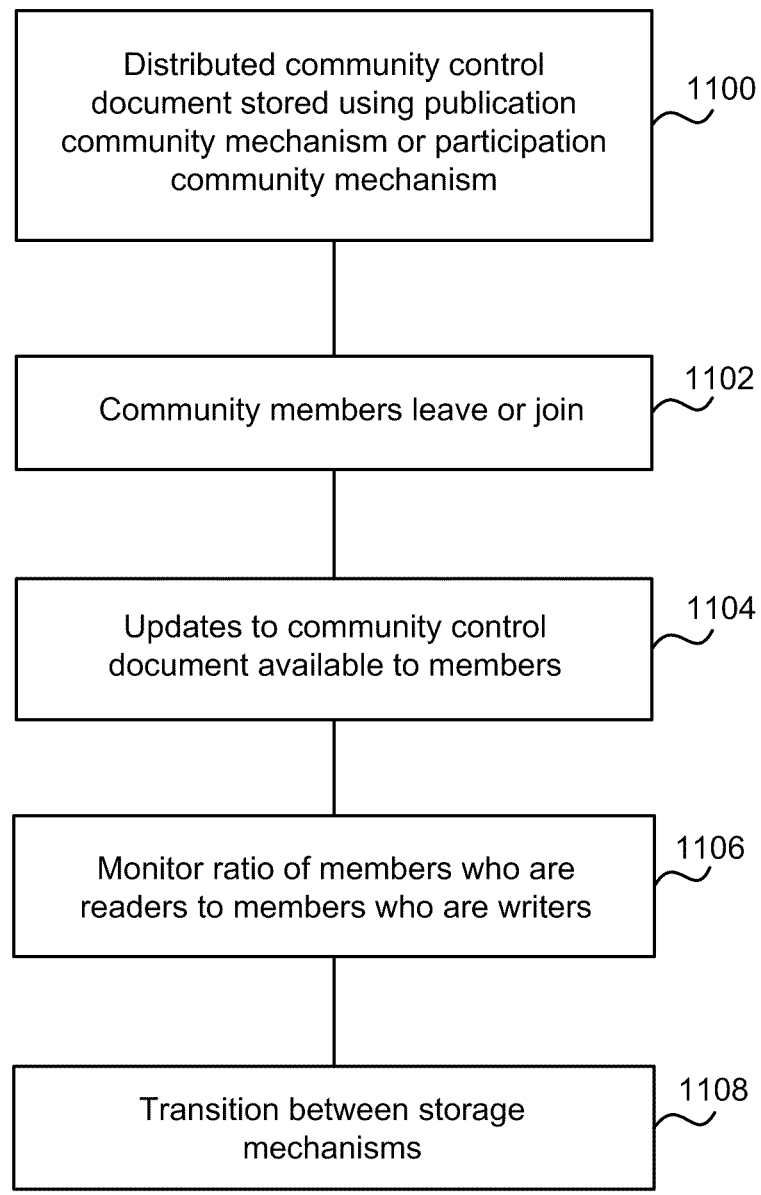
FIG. 11 is a flow diagram of a method of storing a community.

As a community adapts and changes it may be beneficial to switch between the publication community storage mechanism of FIG. 9 and the participation community storage mechanism of FIG. 10. For example, an entity in the distributed computing system may be arranged to monitor the ratio of members of a community who are readers to members who are writers. With reference to FIG. 11 a distributed community control document is stored using a publication community mechanism or a participation community mechanism 1100. Community members leave or join 1102 the community and resulting updates to the community control document are made available to the community members 1104.

The creator/owner or administrator of a community might make reasonable predictions of the makeup of a community (for example, expecting more readers than writers) or might observe the evolution of an existing community over time and choose to transition the community from participatory storage to centralized (web-server-based) storage. The creator/owner or administrator can choose to initially create the community using one or the other storage mechanism, or transition from one storage mechanism to the other without requiring action on the part of other community members. In this way, such administrative transitions are able to occur without any change in experience becoming apparent to community members. Such a change is carried out by marking the 'old' community control document with a reference to the new location.

Figure 12:
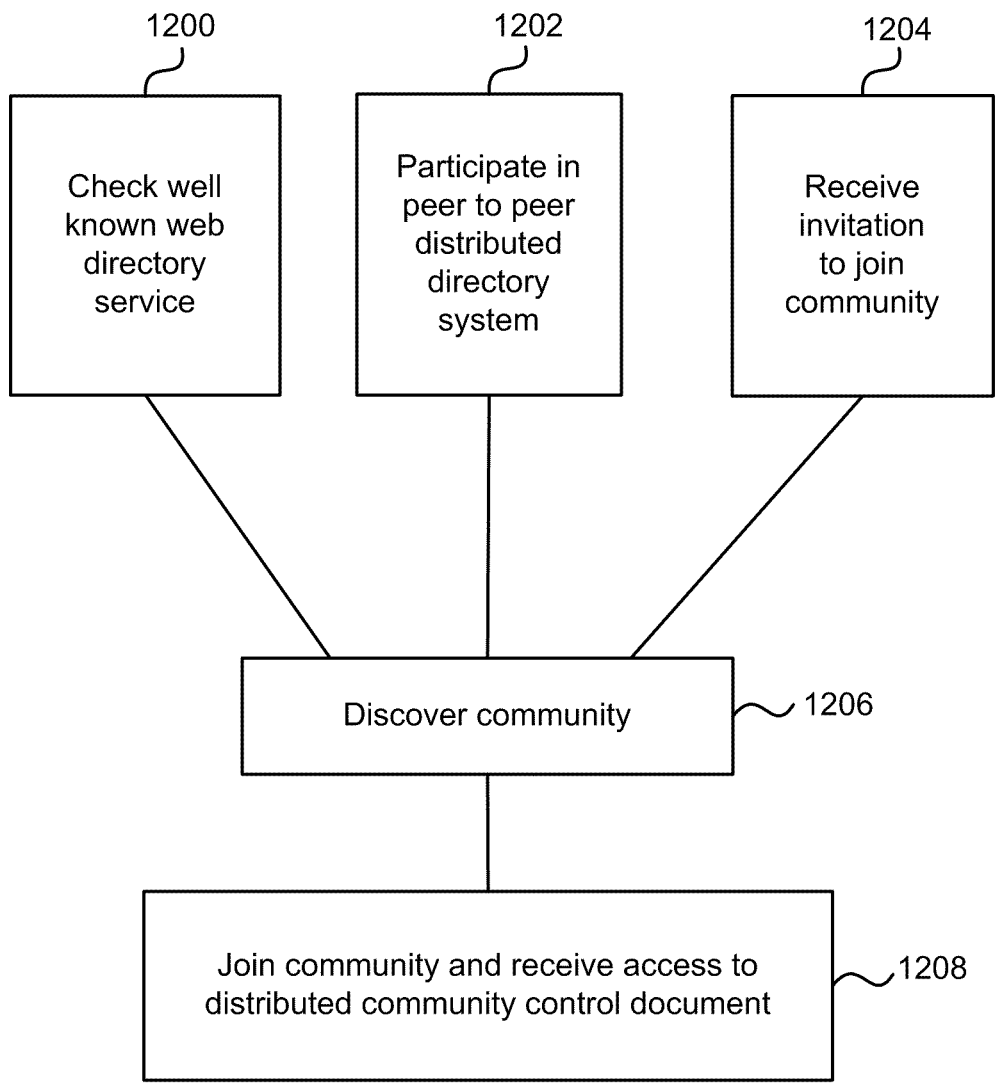
FIG. 12 is flow diagram of a method of discovering and joining a community.

Users may discover and join communities as now described with reference to FIG. 12. A user discovers a community by finding an address (such as a URL or other address) at which the community control document for that community is available. For example, this may be by checking a well known web directory service 1200 or by participating 1202 in a peer to peer distributed directory system. It is also possible to receive 1204 an invitation to join the community, for example, by receiving an invitation message from a current member. Once a community has been discovered 1206 a user may join that community (after credentials checks or other access control checks) and receive 1208 access to the distributed community control document. A community may be publicized through newsgroups, social networking postings, web pages, or in other ways.

Figure 13:
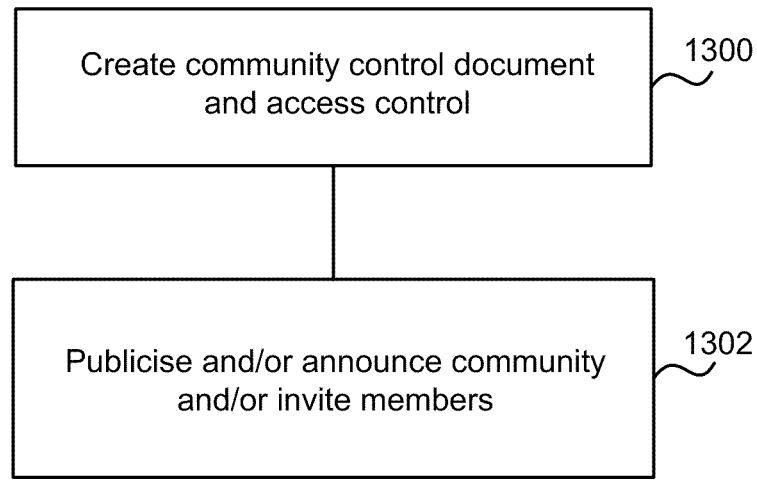
FIG. 13 is a flow diagram of creating a community.

Users may create communities as now described with reference to FIG. 13. A user creates 1300 a community control document and specifies any access control details for the community in that document. The user then publicizes or announces 1302 the existence of the community and invites new members to join.

As mentioned above an entity in the distributed computing system may comprise a reputation system. The reputation system may operate using a points system or equivalent to rate any one or more of users, communities and extensions.

Extensions are units of code that are written to a particular application programming interface and which extend the functionality of a graph engine in some way. Extensions may be distributed via file system (e.g. disk, CD, thumb drive) or network or via communities. A community may contain extensions which may be added to a workspace and then used in any activity created in that workspace. Any extension that is added to a community is available to anyone in that community. Any extension that is added to an activity within a workspace within a community has a copy of that extension stored by reference within the activity. Where-ever that activity is replicated, copied or moved, the extension goes with it, because the activity relies on some aspect of that extension. Extensions are intended to be run in a "sandbox" with no direct access to local disk storage or local registry; extensions are able to store data back into an activity document.

Any user in a community may comment on or rate an extension in the community. The rating may be explicit, for example, by a user giving input specifying the rating. The rating may also be implicit and inferred by the reputation system by observing how often an extension is used. By this mechanism, extensions gain (or lose) reputation among community members. For example, there may be 10 statistical extensions in a community and the good ones will quickly rise in reputation.

Figure 14:
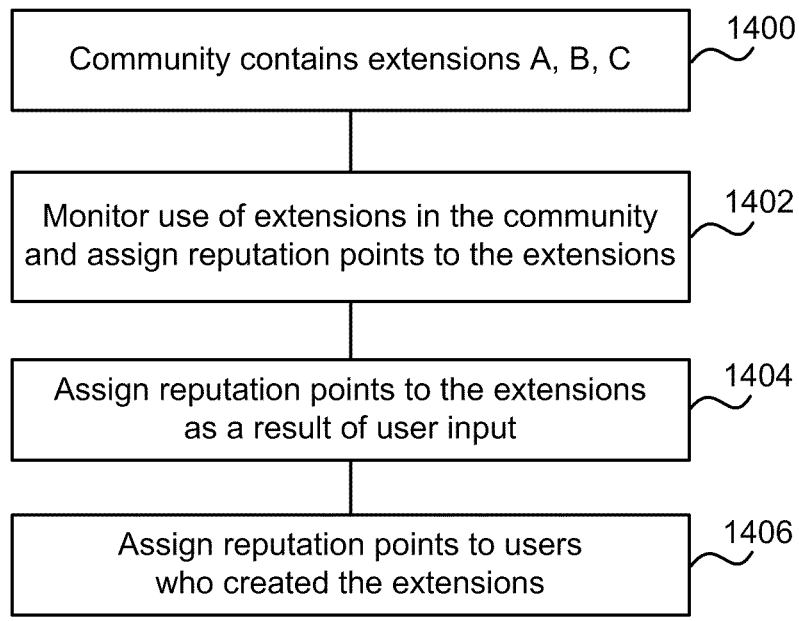
FIG. 14 is a flow diagram of a method at a reputation system.

FIG. 14 is a flow diagram of a method at a reputation system. The reputation system monitors 1400 a community which contains extensions A, B, C. It monitors use of extension in that community and assigns 1402 reputation points to the extensions on the basis of those observations. It is also able to assign 1404 reputation points to the extensions as a result of user input. Reputation points may be "rolled up". For example, the reputation system is able to assign 1406 reputation points to users who created the extensions on the basis of the reputation points assigned to the extensions. In a similar manner reputation points may be assigned to users and to communities.

Figure 15:
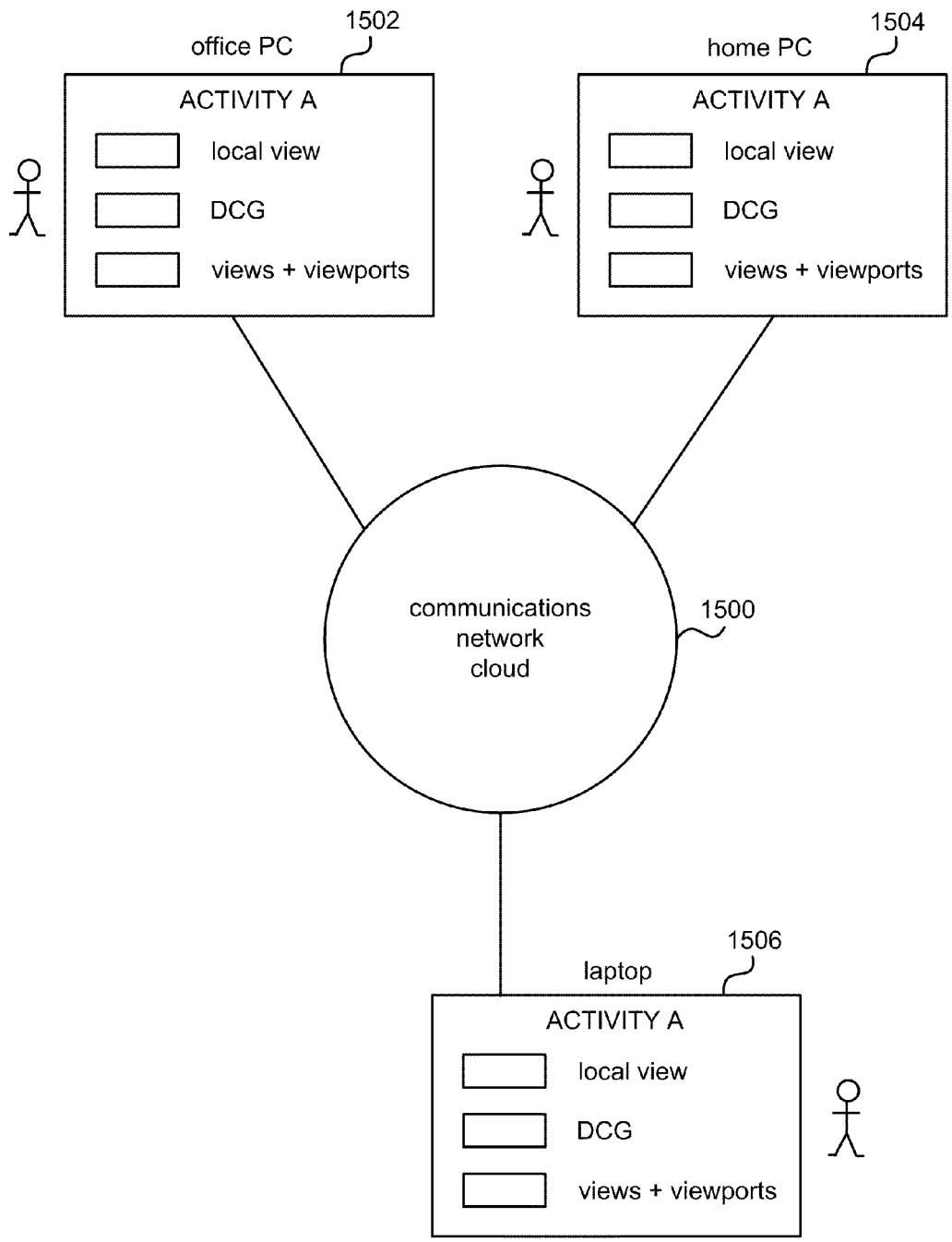
FIG. 15 is a schematic diagram of an activity as a distributed document in a distributed computing system.

FIG. 15 is a schematic diagram of an activity 1502 stored as a document and replicated at each of a plurality of entities 1504, 1506 in a distributed computing system 1500. For example, a user does not have to move their documents from computer to computer. Edits made in the office are available on a home computer as a result of a data synchronization system. Data is stored locally on each computer and synchronized for example, using a peer to peer network substrate or in any other suitable way.

In order to replicate and synchronize the activity document at each entity in a simple and effective manner a particular type of data structure is used to store the document. This data structure is a semi-structured store which is created by forming a tree-based representation of the document and then storing nodes of the tree, and properties associated with those nodes, as rows in a relational database table. This data structure is particularly beneficial in allowing fine scale and accurate version control and conflict resolution. For example, if two users simultaneously make changes to the activity document, any conflicting changes can be detected at a fine scale and either resolved or addressed by branching the document into two.

Figure 16:
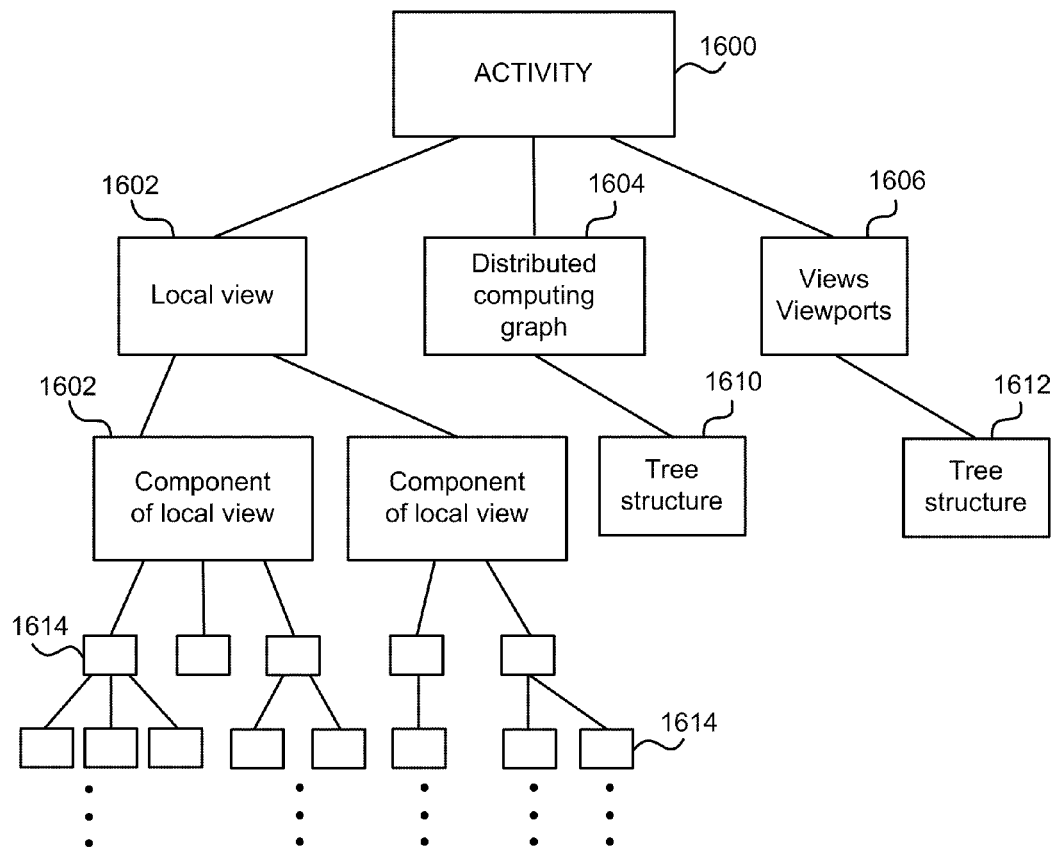
FIG. 16 is a schematic diagram of a tree data structure for storing an activity document.

As mentioned above, an activity comprises a graph layout view, a distributed computing graph and a visualization layer comprising views and viewports. Each of these may be stored as a document as mentioned above so that a complete activity may itself be stored as a document. A tree data structure is used to store the activity document as now described with reference to FIG. 16.

An activity is stored as a root node 1600 having a plurality of child nodes 1602, 1604, 1606 one for each of the graph layout view document, distributed computing graph document and views and viewports document. Each of those child nodes itself has a plurality of child nodes 1608, 1610, 1612 representing lower level components of the documents. Each child node may have more children such as nodes 1614 in FIG. 16 and so on in order to represent all components of the documents to a fine level of detail. Associated with each node are properties such as a date when that component was created, a date when it was last modified, its previous value or other properties. A relational database table is then created with data for each node and each property being stored in a separate row of the table.

For example, activity document may be stored as a hierarchy of rows in a relational database table. Each row may be a NamedObject, AttributedObject, Symbol, or a ContainerObject. A named object is simply a name and no value. An AttributedObject is a NamedObject which has associated with it a list of properties (attributes), each of which is a Symbol. A Symbol is a name/value pair. A ContainerObject is a special type of AttributedObject that can contain other named objects (similar to a folder). Each row in the database also contains version information and a globally unique replication identifier that work together to facilitate replication among different readers/writers on a document and to facilitate version control so that documents edited by two people can be merged at a very fine level rather than having the documents simply be 'the same' or 'different'. For instance, if a graph layout view has five elements on it and user A moves one and user B moves another, those two changes can safely be merged together, as can any changes that do not touch the same row in the database. Any changes which do touch the same row (for instance, two users changing the same title, or moving a flow connection) have to be merged. If the changes result in the same value or end result, they may be silently merged, but if they conflict in some way then one user must chose to either accept one change or the other, or branch the document into two new documents that are now no longer merged.

Figure 17:
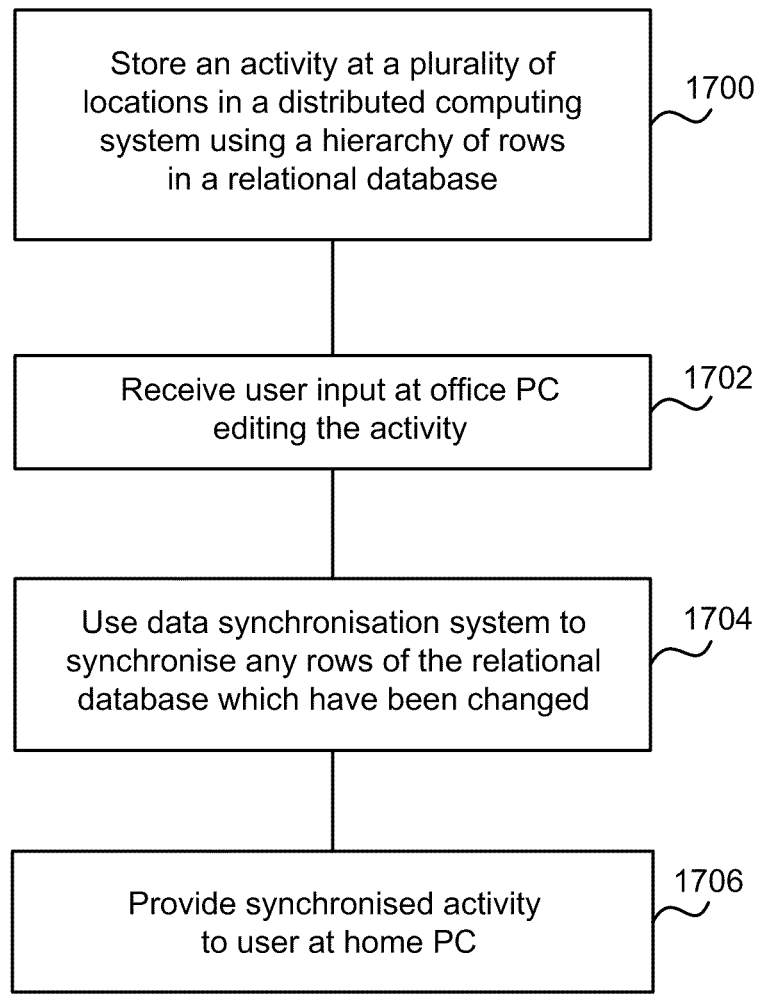
FIG. 17 is a flow diagram of a method of storing and synchronizing an activity as a distributed document.

FIG. 17 is a flow diagram of a method of synchronizing an activity document at a plurality of locations in a distributed computing system. An activity is stored 1700 at a plurality of locations in a distributed computing system using a hierarchy of rows in a relational database. User input is received 1702 at an office PC (for example) editing the activity document. A data synchronization system is then used to synchronize 1704 any rows of the relational database which have been changed. The synchronized activity document may then be provided 1706 to a user at a home PC (for example).

In many cases processes in the distributed computing system run much longer than an individual user's laptop may be turned on for. For example, a user may start a computation that runs in a high performance computer community and then close his or her laptop. Later when the user starts up the laptop it is updated with the latest data from the ongoing computation.

Each part of a computation (each community participant) has its own graph engine which manages the local computation. Each participant has its own copy of the controlling document (the activity) for the ongoing computation. Computations are driven and controlled by the document, not by any one computer, so it is possible to start a computation by opening a document on one computer, and then open the same document on another computer and see the current data. In this way a decentralized document is provided to control a distributed or cloud computing system. Data may also be stored via the document, either in a local location that is replicated to other participants or in a shared well-known location (like a cloud store). These things all work together to create documents that appear to 'run' on the cloud and which appear to continue to run even when a user is not actively watching/controlling them. Documents may stop computing when they have either reached their cache limits or when the calculations naturally wind down.

Figure 18:
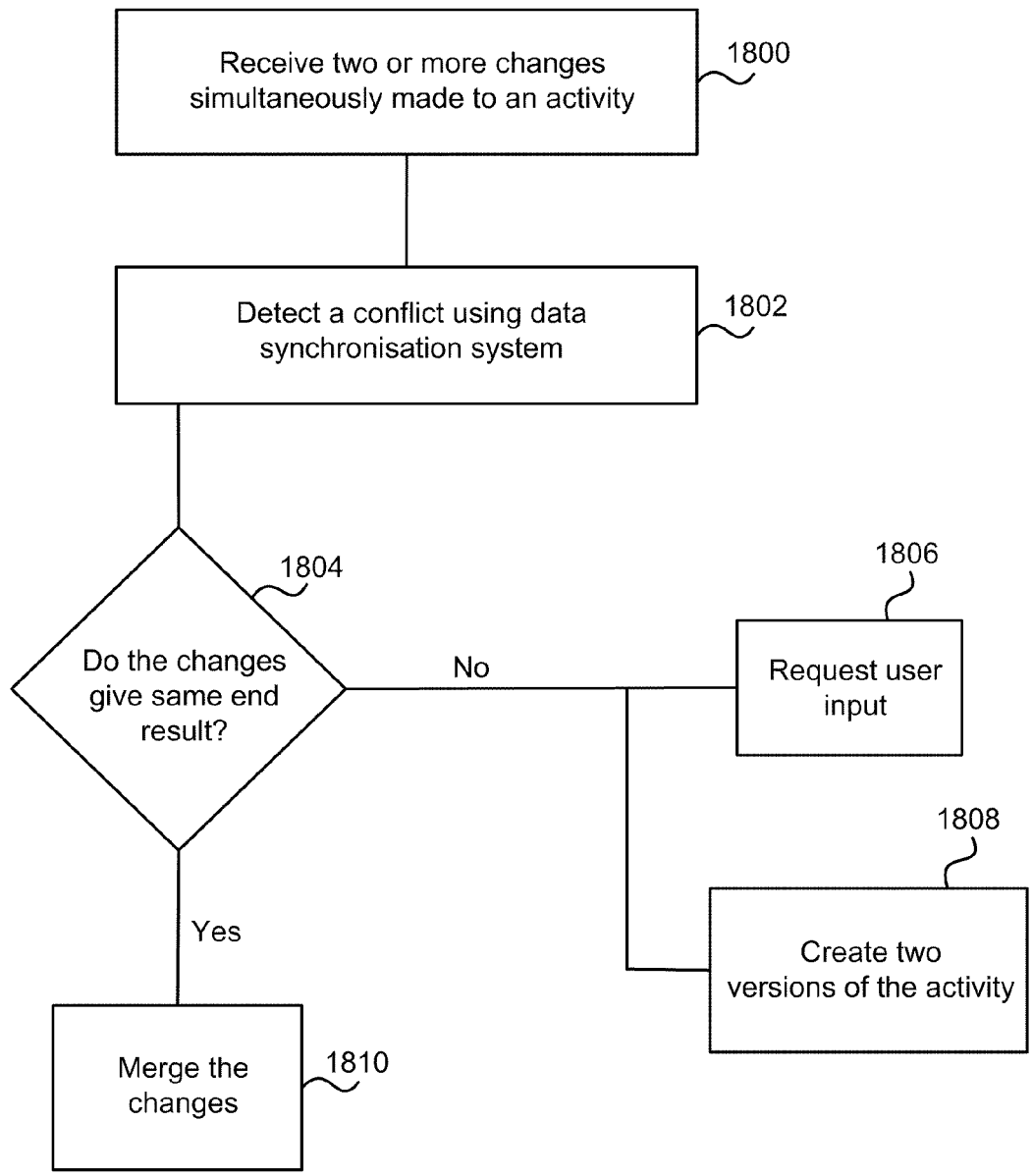
FIG. 18 is a flow diagram of a method of dealing with conflicting changes to an activity stored as a distributed document.

With reference to FIG. 18, if two or more changes are received simultaneously 1800 at the activity document then a check 1802 is made for any conflict using a data synchronization system. If the changes produce the same end result 1804 then the changes are merged 1810. If the changes conflict then user input is requested 1806 and/or two versions of the activity document are created 1808. The branch version of the document can later be merged back with the main document or can continue to exist as a distinct document. The relational database table also allows users to go back in time and recover a previous version of any document.

Figure 19:
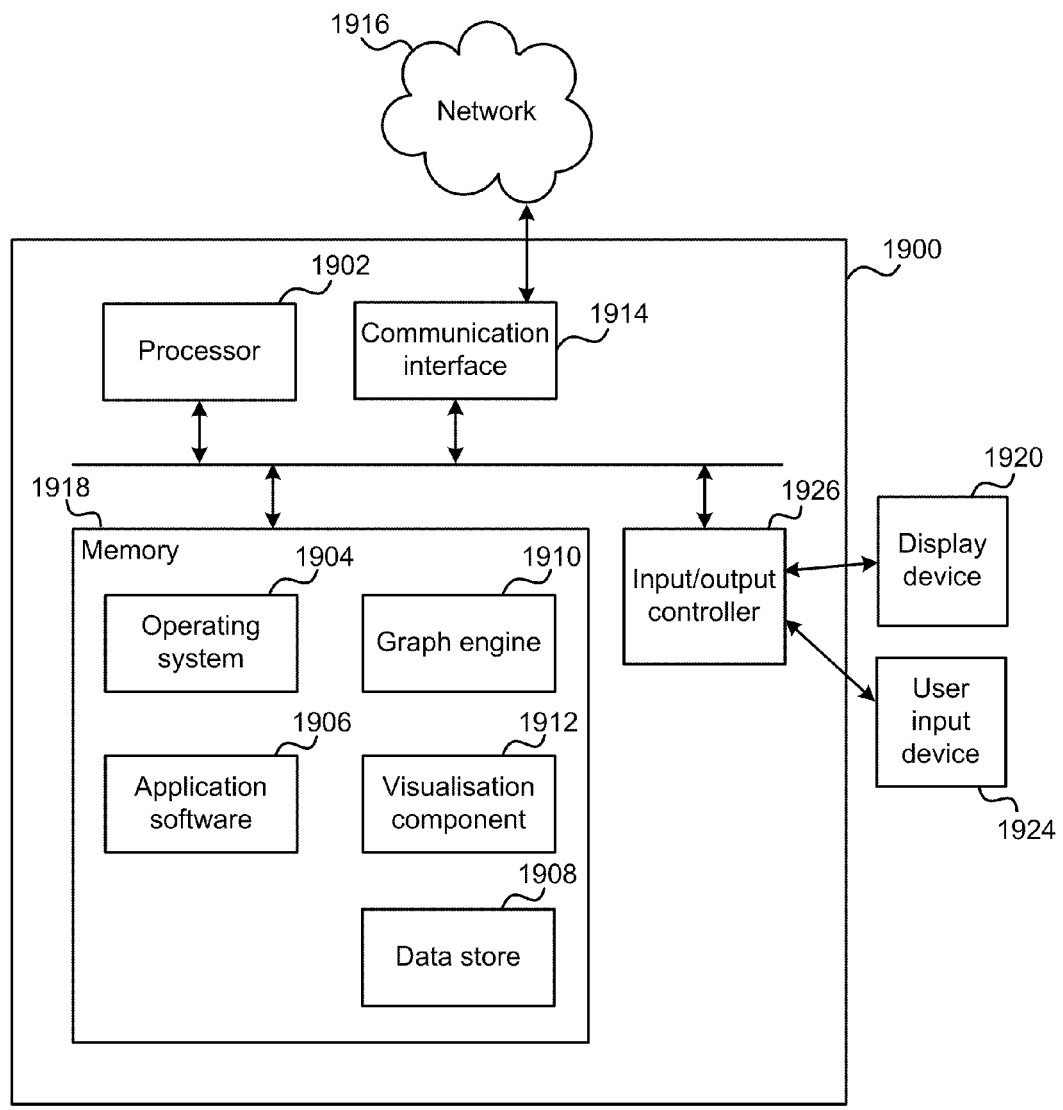
FIG. 19 illustrates an exemplary computing-based device in which embodiments of a graph engine and/or an entity in a distributed computing system may be implemented.

FIG. 19 illustrates various components of an exemplary computing-based device 1900 which may be implemented as any form of a computing and/or electronic device, and in which embodiments of an entity in a distributed computing system may be implemented. The device 1900 may be connected to a communications network 1916 as part of a distributed computing system.

Computing-based device 1900 also comprises one or more processors 1902 which may be microprocessors, controllers or any other suitable type of processors for processing computing executable instructions to control the operation of the device in order to operate as part of a distributed computing system. Platform software comprising an operating system 1904 or any other suitable platform software may be provided at the computing-based device to enable application software 1906 to be executed on the device. The computing-based device comprises a graph engine 1910 which implements a dynamic mapping with a distributed computing graph as described herein. A visualization component 1912 may be provided to implement a visualization layer associated with the distributed computing graph. A data store 1908 may be provided to buffer, store or cache data.

The computer executable instructions may be provided using any computer-readable media that is accessible by computing based device 1900. Computer-readable media may include, for example, computer storage media such as memory 1918 and communications media. Computer storage media, such as memory 1918, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (memory 1918) is shown within the computing-based device 1900 it will be appreciated that the storage may be distributed or located remotely and accessed via a network or other communication link (e.g. using communication interface 1914).

The computing-based device 1900 also comprises an input/output controller 1926 arranged to output display information to a display device 1920 which may be separate from or integral to the computing-based device 1900. The display information may provide a graphical user interface. The input/output controller 1926 is also arranged to receive and process input from one or more devices, such as a user input device 1924 (e.g. a mouse or a keyboard). This user input may be used to influence or select data to be presented on the display device 1920. In an embodiment the display device 1920 may also act as the user input device 1924 if it is a touch sensitive display device. The input/output controller 1926 may also output data to devices other than the display device, e.g. a locally connected printing device.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method at an entity in a distributed computing system comprising:
    providing an input arranged to connect to the distributed computing system and access a distributed computing graph associated with an activity to be carried out in the distributed computing system, the distributed computing graph representing currently executing processes in the distributed computing system;
    arranging a processor to provide a dynamic mapping between the distributed computing graph and a data structure at the entity holding a graph layout view of the distributed computing graph such that changes in the graph layout view are reflected in the distributed computing graph;

receiving user input adding a first community in the graph layout view the first community comprising computing resources in the distributed computing system;

receiving user input placing a first graphical element in the first community, the first graphical element representing at least a first one of the currently executing processes;

using the processor to update the distributed computing graph such that the first currently executing process runs on computing resources of the first community;

receiving user input placing a second graphical element outside all communities displayed on the graph layout view, the second graphical element representing at least a second one of the currently executing processes; and using the processor to update the distributed computing graph such that the second currently executing process represented by the second graphical element runs on computing resources of a local machine.

2. A method as claimed in claim 1 at an entity remote of the computing resources of the first community.

3. A method as claimed in claim 1 which comprises storing metadata for the first community.

4. A method as claimed in claim 1 which comprises using the processor to update the distributed computing graph to automatically incorporate data formatting processes such that data is able to flow between the first community and other processes in the distributed computing graph.

5. A method as claimed in claim 1 which comprises receiving user input adding a second community to the graph layout view inside the first community.

6. A method as claimed in claim 1 which comprises storing parameters for a community the parameters specifying conditions to be met by computing resources in the community.

7. A method as claimed in claim 1 which comprises storing a community control document listing members of the community and actions which those members are able to carry out with respect to the community; and making the community control document available to all members of the community.

8. A method as claimed in claim 7 which comprises monitoring a number of community members which are able to write to the community control document versus a number of community members which are able to read from the community control document and, on the basis of the monitored numbers, facilitating changes to the storage of the community control document that are transparent to the users in the affected community.

9. A method as claimed in claim 1 which comprises discovering a community by any of: receiving an invitation message, participating in a peer to peer distributed directory system and checking a web directory service.

10. A method as claimed in claim 1 which comprises forming a community by creating and storing a community control document and announcing or inviting members to join.

11. A method as claimed in claim 1 which comprises receiving user input adding an extension to the first community that extension being code which is available to all members of the first community.

12. A method as claimed in claim 11 which comprises monitoring use of the extension and assigning reputation points to the extension on the basis of the monitored use.

13. A method as claimed in claim 1 which comprises storing the graph layout view, the distributed computing graph and visualization elements associated with the distributed computing graph as a document; and replicating and synchronizing that document at a plurality of entities in the distributed computing system.

14. A method as claimed in claim 13 which comprises storing the document using a semi-structured property store.

15. A method as claimed in claim 13 which comprises storing the document using a hierarchy of rows in a relational database table.

16. A method as claimed in claim 15 which comprises synchronizing the document by updating rows of the relational database stored at different entities in the distributed computing system.

17. A method as claimed in claim 13 which comprises: using a tree structure to store the document where nodes of the tree represent components of the document and have associated properties; and storing each node of the tree and each property as a row in a relational database.

18. A graph engine at an entity in a distributed computing system, the graph engine comprising:

an input arranged to connect to the distributed computing system and access a distributed computing graph associated with an activity to be carried out in the distributed computing system, the distributed computing graph representing currently executing processes in the distributed computing system;

a processor arranged to provide a dynamic mapping between the distributed computing graph and a data structure at the entity holding a graph layout view of the distributed computing graph such that changes in the graph layout view are reflected in the distributed computing graph;

a graphical user interface arranged to receive user input adding a first community in the graph layout view the first community comprising computing resources in the distributed computing system;

the graphical user interface also being arranged to receive user input placing a first graphical element in the first community, the first graphical element representing at least a first one of the currently executing processes;

the processor being arranged to update the distributed computing graph such that the first currently executing process runs on computing resources of the first community;

the graphical user interface also being arranged to receive user input placing a second graphical element outside all communities displayed in the graph layout view, the second graphical element representing at least a second one of the currently executing processes; and the processor being arranged to update the distributed computing graph such that the second currently executing process runs on computing resources of a local machine.

19. A graph engine as claimed in claim 18 having a memory arranged to store parameters specifying conditions that computing resources in the community are to meet.

20. A distributed computing system comprising:

a plurality of computing devices connected using a communications network, each computing device having a copy of a controlling document for controlling computations currently executing at the computing devices and which are part of the same activity, wherein a graphical element, representing a computation, being positioned outside each community represented in a distributed computing graph associated with the controlling document indicates that the computation is executed on a local machine;

a replication mechanism arranged to replicate and synchronize the controlling document at each computing device; and a graph engine provided at each of the computing devices and arranged to manage any computations of the activity which are currently executing at that computing device using the controlling document.

* * * * *